(12) United States Patent
Blase et al.

(10) Patent No.: US 11,332,064 B2
(45) Date of Patent: May 17, 2022

(54) CONTROL OF A DIRECTED LIGHT SOURCE

(71) Applicant: Robert Bosch GmbH, Stuttgart (DE)

(72) Inventors: Benjamin Blase, Bietigheim-Bissingen (DE); Mustafa Kamil, Leonberg (DE); Raimund Reppich, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/607,013

(22) PCT Filed: Apr. 12, 2018

(86) PCT No.: PCT/EP2018/059371
§ 371 (c)(1),
(2) Date: Oct. 21, 2019

(87) PCT Pub. No.: WO2018/197225
PCT Pub. Date: Nov. 1, 2018

(65) Prior Publication Data
US 2020/0384912 A1 Dec. 10, 2020

(30) Foreign Application Priority Data
Apr. 25, 2017 (DE) .......................... 102017206923.6

(51) Int. Cl.
*B60Q 1/14* (2006.01)
*H05B 47/105* (2020.01)

(52) U.S. Cl.
CPC ........... *B60Q 1/143* (2013.01); *H05B 47/105* (2020.01); *B60Q 2300/056* (2013.01)

(58) Field of Classification Search
None
See application file for complete search history.

(56) References Cited

U.S. PATENT DOCUMENTS 8,820,782 B2 * 9/2014 Breed .................... B60N 2/888
280/735
8,917,169 B2 * 12/2014 Schofield .............. B60S 1/0822
340/425.5

(Continued)

FOREIGN PATENT DOCUMENTS

DE 19707936 A1 9/1998
DE 19910667 A1 9/2000

(Continued)

OTHER PUBLICATIONS

International Search Report for PCT/EP2018/059371, dated Aug. 10, 2018.

(Continued)

*Primary Examiner* — Srinivas Sathiraju
(74) *Attorney, Agent, or Firm* — Norton Rose Fulbright US LLP; Gerard Messina

(57) ABSTRACT

A directed light source supplies a light cone which is guided across a predefined area. A method for controlling the light source includes determining a movement of the light source; estimating an impending change in a section of the area illuminated by the light cone as a result of the determined movement; determining that the section will most likely be illuminated by the changed light cone for longer than predefined; and supplying a dimming signal for the light source.

12 Claims, 3 Drawing Sheets

(56) References Cited

U.S. PATENT DOCUMENTS

| | | | |
|---|---|---|---|
| 9,121,703 B1* | 9/2015 | Droz | G01S 7/484 |
| 9,509,957 B2* | 11/2016 | Higgins-Luthman | H04N 7/18 |
| 9,534,756 B2* | 1/2017 | Takahira | F21S 41/176 |
| 9,545,875 B2* | 1/2017 | Mohamed | B60Q 1/525 |
| 9,651,789 B2* | 5/2017 | Osterhout | G06F 3/012 |
| 9,720,241 B2* | 8/2017 | Osterhout | G02B 27/0179 |
| 9,809,153 B2* | 11/2017 | Park | F21S 41/16 |
| 9,810,775 B1* | 11/2017 | Welford | H01S 3/113 |
| 9,956,901 B2* | 5/2018 | Nakanishi | F21S 41/698 |
| 9,993,335 B2* | 6/2018 | Deering | G02B 13/16 |
| 10,198,864 B2* | 2/2019 | Miller | G06K 9/00577 |
| 10,366,603 B2* | 7/2019 | Ohta | B60Q 1/04 |
| 10,379,365 B2* | 8/2019 | Osterhout | G06K 9/209 |
| 10,386,488 B2* | 8/2019 | Ridderbusch | G01S 7/4817 |
| 10,436,880 B2* | 10/2019 | Hofmann | G01S 7/4814 |
| 10,685,488 B1* | 6/2020 | Kumar | G06F 3/011 |
| 10,705,598 B2* | 7/2020 | Steedly | A63F 13/213 |
| 10,719,125 B2* | 7/2020 | Steedly | A63F 13/22 |
| 10,732,279 B2* | 8/2020 | Schlotterbeck | G01S 17/04 |
| 10,775,504 B2* | 9/2020 | Garde | G01S 17/95 |
| 10,860,100 B2* | 12/2020 | Osterhout | G06F 3/013 |
| 2005/0205755 A1 | 9/2005 | Walsh et al. | |
| 2009/0273770 A1* | 11/2009 | Bauhahn | G01C 3/08 |
| | | | 356/5.01 |
| 2010/0292886 A1 | 11/2010 | Szczerba et al. | |
| 2011/0025209 A1* | 2/2011 | Nakanishi | B60Q 1/143 |
| | | | 315/82 |
| 2011/0121160 A1* | 5/2011 | Gion-Pol | G01S 7/484 |
| | | | 250/205 |
| 2012/0242974 A1* | 9/2012 | LaValley | G01S 17/87 |
| | | | 356/5.01 |
| 2013/0258689 A1* | 10/2013 | Takahira | F21S 41/176 |
| | | | 362/465 |
| 2014/0086590 A1* | 3/2014 | Gan | G06Q 30/02 |
| | | | 398/118 |
| 2015/0241963 A1* | 8/2015 | Nortrup | G06F 3/012 |
| | | | 345/156 |
| 2015/0301787 A1* | 10/2015 | Greco | G06F 3/016 |
| | | | 345/633 |
| 2015/0312560 A1* | 10/2015 | Deering | A61F 2/1602 |
| | | | 345/1.3 |
| 2016/0026253 A1* | 1/2016 | Bradski | H04N 13/167 |
| | | | 345/8 |
| 2016/0119756 A1* | 4/2016 | Ryan | H04W 4/029 |
| | | | 398/118 |
| 2017/0072880 A1* | 3/2017 | Higgins-Luthman | H04N 7/18 |
| 2017/0082736 A1 | 3/2017 | Hofmann et al. | |
| 2018/0029525 A1* | 2/2018 | Park | B60R 1/00 |
| 2018/0164439 A1* | 6/2018 | Droz | G01S 17/89 |
| 2018/0306899 A1* | 10/2018 | Ryan | H04W 4/33 |
| 2019/0178998 A1* | 6/2019 | Pacala | G05D 1/0238 |
| 2019/0182415 A1* | 6/2019 | Sivan | G06F 1/163 |
| 2019/0271767 A1* | 9/2019 | Keilaf | G01S 7/4863 |
| 2020/0049824 A1* | 2/2020 | Frederiksen | G01S 17/42 |
| 2020/0146132 A1* | 5/2020 | Chen | F21V 14/04 |
| 2020/0333878 A1* | 10/2020 | Steedly | A63F 13/22 |
| 2020/0384912 A1* | 12/2020 | Blase | G02B 26/10 |

FOREIGN PATENT DOCUMENTS

| | | |
|---|---|---|
| DE | 102014211073 A1 | 12/2015 |
| DE | 102014223900 A1 | 5/2016 |
| DE | 102015217908 A1 | 3/2017 |
| WO | 2016169914 A1 | 10/2016 |

OTHER PUBLICATIONS

"Safety of Laser Products", IEC Standard 60825-1, Edition 1.2, Aug. 2001, 122 pages.

* cited by examiner

CONTROL OF A DIRECTED LIGHT SOURCE

FIELD OF THE INVENTION

The present invention relates to the control of a directed light source. More specifically, the present invention relates to the control of a light source of an optical scanning device.

BACKGROUND INFORMATION

An optical scanning device on board a motor vehicle is provided for the purpose of scanning an environment of the motor vehicle. More specifically, an object in a scanning region is to be detected and scanned in terms of its distance and/or speed in relation to the motor vehicle. Toward this end, a laser illuminates the scanning region, and a receiving device receives reflected light. The scanning region is usually scanned in sequence in that a punctiform laser beam is guided along lines arranged on top of one another. A rotating polygonal mirror, for instance, may be used for that purpose.

The range of the scanning device may be dependent upon the power of the laser beam. On the other hand, the power must be restricted in order to prevent a laser beam from impinging upon a human eye and causing an injury. The IEC standard 60825-1 defines limit values for ensuring eye safety.

The motor vehicle may be exposed to vibrations or shocks so that the laser beam is not always able to point in the intended direction. As a result, a point in the environment of the motor vehicle may be exposed to the laser radiation for a longer period of time so that the energy impinging upon this point may be greater on average over time. Until now, the light output had to be reduced in order to comply with eye safety, which also decreases the range.

SUMMARY OF THE INVENTION

One object on which the present invention is based is to provide an improved technique for controlling a directed light source. The present invention achieves this objective by the subject matters of the independent claims. The dependent claims indicate specific embodiments.

A directed light source provides a light cone, which is guided across a predefined area. A method for controlling the light source includes steps of determining a movement of the light source; estimating an impending change in a section of the area illuminated by the light cone as a result of the determined movement; determining that the changed light cone will most likely illuminate the section for longer than predefined; and providing a dimming signal for the light source.

A light cone is mainly considered to be the part of space through which light emitted by a light source propagates. The light source may include a laser, and the light emitted by the light source may be sharply focused so that a light cone emitted by the light source closely resembles a cylindrical shape and widens only minimally in the distance. The section illuminated by the light cone may be modeled as an area that is located perpendicular to the propagation direction of the light cone. An energy input into this area caused by the light cone within a predefined period of time is not to exceed a predefined threshold value. For example, the threshold value may be gathered from the IEC standard 60825-1 or a comparable standard. A first exemplary limit value relates to the maximum energy in a single light pulse, a second exemplary limit value relates to an accumulated energy across a plurality of light pulses, and a third exemplary limit value relates to a reduced single-pulse criterion across a plurality of light pulses. The present invention may be used in particular for compliance with this third limit value.

The present method is able to ensure that the light source is dimmed when an overexposure of the section is expected. This makes sure that a human or animal eye that is located in the particular section will not be injured by the extended exposure. The transmission power of the light source may be selected to be relatively large while maintaining eye safety so that a reflection of the light is able to be detected in a reliable manner even at a relatively large distance from the light source. A scanning power of an optical sensor device controlling the light cone is able to be increased.

In one specific embodiment, a plurality of non-overlapping sections in the area is predefined and the light cone illuminates the sections one after the other for a predefined period of time in each case. The light source may be operated on a discontinuous basis and in particular intermittently for this purpose. The sections are able to be illuminated one by one using a predefined light pulse. A partial illumination or a complete repeat illumination of one of the sections within a predefined time window is able to be avoided by the present method. The time window may be predefined as a marginal condition of a threshold value for the energy of the light cone that must not be exceeded in order to ensure eye safety.

The anticipated change may be determined with the aid of a Kalman filter. The Kalman filter may be parameterized in such a way that it allows for a reliable prediction within a time range required for the evaluation of all signals and for dimming of the light source. This time usually lies in the range of a few 10 ms to a few 100 ms. More specifically, the Kalman filter allows for the consideration of a determination accuracy, which indicates the probability of the prediction of the change in the light coming true. If the determination accuracy is low, then the dimming signal may be output as a precaution even if only a small angle overlap over time is to be expected. If the determination accuracy is high, on the other hand, then the dimming signal may be output only when a greater angle overlap is to be expected over time.

The change may relate to an alignment of the light source. For example, the light source may include a lens or a mirror which changes the direction of the light cone on account of the movement of the light source. The light source may represent an elastic system so that a deflection of the light source possibly acts on the deflecting or focusing element with a time delay.

The change may also relate to an opening angle of the light source. In particular when the light source includes multiple reflective or refractive elements, a shock or a sudden movement may defocus the light cone. The changed form of the light cone is able to be taken into account when determining the impending angle overlap over time.

In one further specific embodiment, an inaccuracy of available information relating to the light cone is taken into account. For example, a radiation direction of the light cone under the influence of an acceleration on the light source may be known only with a reduced accuracy. In order to reliably prevent the occurrence of eye injuries, the light cone may be assumed to have a predefined inaccuracy. Expressed in geometrical terms, the considered light cone is selected to be greater. The greater the known inaccuracy of the available information, the larger the diameter of the light source may be.

A control unit for a directed light source whose light cone is guided across a predefined area includes a scanning device for determining a movement of the light source; a processing device, which is configured to estimate an impending change in a section of the area illuminated by the light cone as a result of the determined movement; and an interface for supplying a dimming signal for the light source if the section is expected to be exposed to the changed light cone for longer than predefined.

The directed light source may be part of an optical scanning device, an adaptive laser spotlight or a further sensor device. The control unit may be configured to dim the light source. The dimming may particularly include a deactivation of the light source. The directed light source may be configured to emit laser light. A frequency range of the light may be very low so that it could be said to involve a monochromatic light.

An optical sensor device includes the afore-described control unit, the directed light source, and a receiving device, which is configured to receive light that was reflected by an object in the light cone. More specifically, the optical sensor device may be part of a LIDAR scanner.

In one particular specific embodiment, the sensor device is configured to be fixed in place on a motor vehicle. The scanning device may be configured to determine a movement of the motor vehicle. The scanning device may particularly be fixed in place at a random location on the motor vehicle and be connected to the sensor device.

The present invention will now be described in greater detail with reference to the figures.

DETAILED DESCRIPTION

Figure 1:
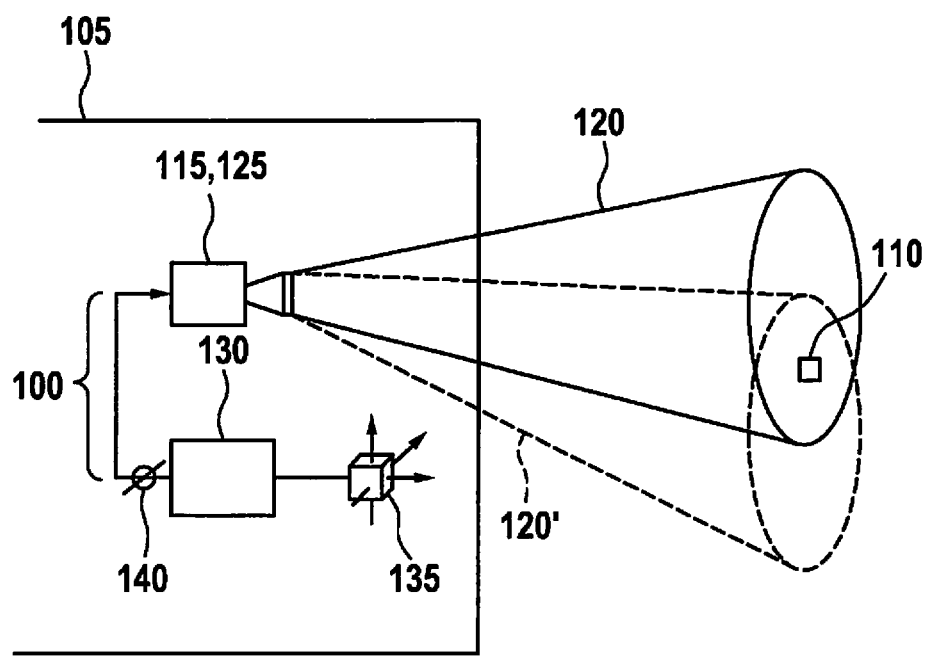
FIG. 1 shows an optical sensor device on board a motor vehicle.

FIG. 1 shows a sensor device 100 on board a motor vehicle 105. Sensor device 100 is configured for the optical scanning of a predefined area in the environment of motor vehicle 105. In particular, an object is to be optically scanned, in the process of which a size, shape, speed or acceleration is able to be determined.

Optical sensor device 100 includes a light source 115, which is configured to emit a light cone 120; a receiving device 125, which is configured to receive light that was emitted by light source 115 and reflected at an object 110; a control unit/processing device 130 and a scanning device 135. An interface 140 via which a dimming signal is able to be supplied to light source 115 by control unit/processing device 130 may be provided.

Light source 115 is actuated in such a way that light cone 120 is guided across the predefined area. In particular, a multitude of sections 110 may be predefined toward which light cone 120 is directed at a predefined sequence. Light source 115 may be activated continuously or only when it is directed toward a section 110.

Motor vehicle 105 may be exposed to movements that could influence an alignment or focusing of light cone 120. For example, a vibration, a shock, an acceleration or some other unexpected event on motor vehicle 105 may move light source 115 so that light cone 120 is changed into light cone 120'. Section 110 may then be illuminated for longer or be illuminated multiple times either fully or partially. If a sensitive object such as a human eye is located within this section 110, then the emissions of light source 115 may cause damage.

It is provided to determine a movement of motor vehicle 105 or of light source 115 using scanning device 135 and to predict with the aid of control unit 130 in which way light cone 120 is expected to change as a result of the movement. If there is a risk that a section 110 will be exposed to light cone 120 for longer than predefined, then a dimming signal is able to be supplied to light source 115. More specifically, light source 115 may be switched off temporarily until light source 115 is no longer directed at section 110 or until the effect on motor vehicle 105 or light source 115 has abated.

Scanning device 135 may include a micromechanical sensor, which may encompass an acceleration and/or a yaw rate sensor, in particular. Scanning device 135 may be provided in the form of an inertial sensor or an inertial measuring unit. Movements and/or accelerations along or about three axes may be scannable so that a six-axis sensor unit is formed as a whole. Especially when configured as a micromechanical system, scanning device 135 may be cost-effective and small. In one specific embodiment, scanning device 135 is mechanically connected to light source 115 and determines its movement directly. In another specific embodiment, scanning device 135 is connected to motor vehicle 105 and determines the movement of motor vehicle 105 which continues to act on light source 115.

Figure 2:
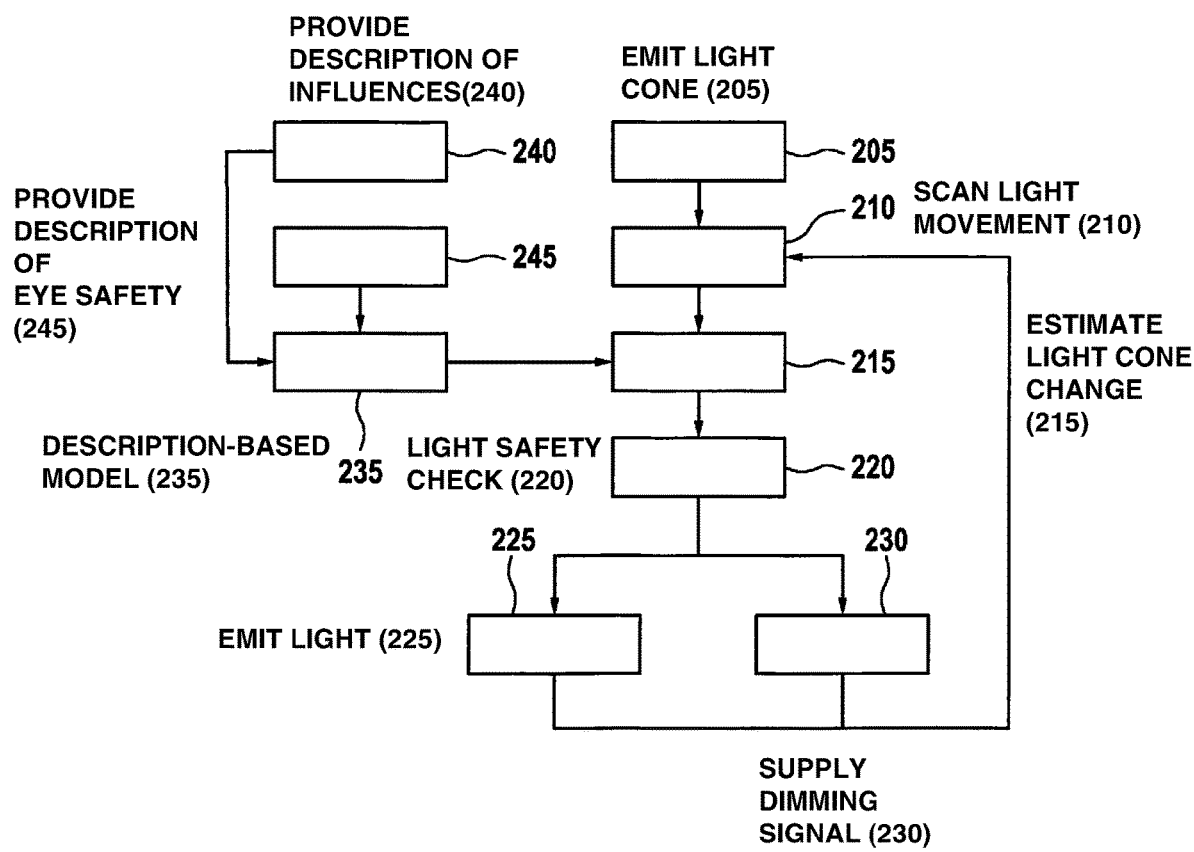
FIG. 2 shows a flow diagram of a method for controlling an optical scanning device.

Scanning device 135 may also be used for additional purposes on board motor vehicle 105, e.g., for an image correction or image synchronization of an image that is supplied with the aid of sensor device 100. In particular, control unit 130 may include a programmable microcomputer or microcontroller, which is configured to execute a program provided in the form of a computer program product. More specifically, a method described below with reference to FIG. 2 is able to be executed using control unit 130. Features or advantages of the present method may correspondingly relate to sensor device 100 or to control unit 130, and vice versa.

In order to allow for timely dimming or a deactivation of light source 115, the dimming signal must be supplied before an overillumination of section 110 has occurred. As a result, control unit 130 may be configured to determine an impending change in light cone 120 into modified light cone 120'. Toward this end, the change in light cone 120 is able to be predicted, in particular with the aid of a Kalman filter, which is going to be described in greater detail in the following text. If the predicted change causes a predefined overillumination of the section, then the dimming signal is able to be provided prior to the occurred overillumination.

FIG. 2 shows a flow diagram of a method 200 for the control of light source 115, HO and receiving device 125. Method 200 may be configured to run at least in part on control unit 130.

In a step 205, light source 115 emits light in the form of light cone 120. Light source 115 is controlled in such a way that light cone 120 is guided across a predefined area in a predefined manner. In this way a multitude of sections 110 may be illuminated in sequence by light cone 120. In one specific embodiment, the alignment and/or the activation of light source 115 take(s) place in a discontinuous manner in order to illuminate individual predefined sections 110 one after the other.

In a step 210, a movement of light source 115 is able to be determined with the aid of scanning device 135. The movement, for example, may stem from an acceleration or a shock when motor vehicle 105 drives through a pothole or across a curbstone. Acceleration or yaw rate values that are characteristic of the respective situation may arise in the process.

In a step 215, based on one or a plurality of measurement(s) with the aid of scanning device 135, an estimate is performed as to whether and in which way light cone 120 will be changed into a changed light cone 120'. A prediction period could be relatively short in this case because it merely needs to be ensured that dimming or a deactivation of light source 115 is able to be carried out before light source 115 irradiates a section 110 with more than a predefined energy within a predefined period of time. The prediction horizon is thus predominantly dependent upon the processing time required for the estimate in step 215. Additional influencing factors may include a signal propagation time or a measuring duration.

In a step 220, it is checked whether an impending light emission of light source 115 is safe to eyes. This is the case if an energy quantity directed at section 110 complies with a predefined threshold value with at least a predefined probability. If it is to be assumed that the energy quantity will be exceeded, then eye safety may be ensured nevertheless if light source 115 is dimmed or switched off in a timely manner.

If it was determined that the operation of light source 115 is safe to eyes, light source 115 may be actuated in a step 225 for the emission of light. In the opposite case, a dimming signal is able to be supplied to light source 115 in a step 230. In an additional, exemplary or specific embodiment, the emission of light may be suspended until light source 115 reaches step 220 the next time. In this case, a further change in light cone 120 may be extrapolated, in particular on the basis of measured values of scanning device 135. Method 200 may then return to step 210 and be cycled through again.

The estimating in step 215 may be realized with respect to a model 235. Model 235 may particularly include a mathematical representation of the influences of an acceleration or a yaw rate on the direction or the opening angle of light cone 120. A determination reliability may also be taken into account so that an estimate 215 is able to be carried out in a conservative manner on the basis of model 235 in that dimming is already induced when it cannot be determined with sufficient certainty that an impending emission will be safe to eyes.

Model 235 may be based on a description 240 of influences or situations and/or a description 245 of eye safety. Description 240, for instance, may include characteristic acceleration or yaw rate curves that are typically cycled through when motor vehicle 105 drives over a bump in the road, through a pothole or across a curbstone. This makes it possible to predict future acceleration or yaw rate measurements in step 210 provided sufficient information for selecting a prototypical situation is available.

Description 245 of eye safety is able to take into account the rate at which light source 115 is emitting light. In addition, an opening angle of light cone 120 may be considered in order to determine a resulting light energy at a predefined distance from light source 115. In total, description 245 may indicate under what conditions eye safety is provided and under what conditions this is not the case. Toward this end, description 245 may particularly adhere to an official standard relating to compliance with eye safety.

Figure 3:
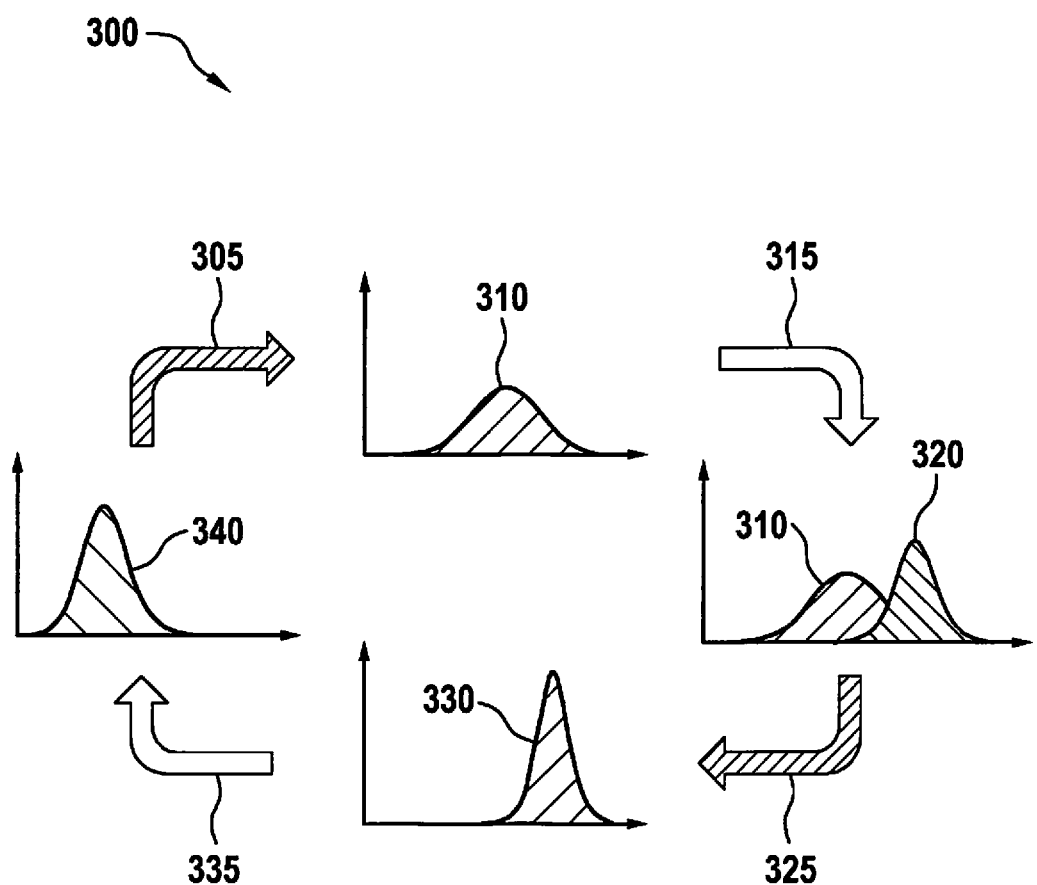
FIG. 3 shows an illustration of the method of functioning of a Kalman filter.

FIG. 3 shows an illustration of an exemplary Kalman filter 300. A Kalman filter 300 is a trusted mathematical method that is known per se and based on measured values and which allows a prediction of parameters that are a function of the measured values. Kalman filter 300 may be implemented or realized in particular with the aid of control unit 130.

Kalman filter 300 usually operates recursively. It is therefore possible to start with an explanation of Kalman filter 300 at an arbitrary point of the illustration from FIG. 3. Purely by way of example, a prediction 305 of a state description of the physical system to be modeled takes place to begin with. The physical system is normally described by its input and output variables, the relations between these variables being at least approximately known in some form. Internal variables that are unable to be externally monitored may also be included in the system description. In the present case, the input variables may include yaw rate or acceleration values, in particular, and output values may include a direction (horizontal, vertical) and/or an opening angle of light cone 120.

Prediction 305 thus supplies a state 310, which, for instance, may be expressed in a mathematical notation as a vector of the input and output variables. A measurement 315 of actual input and/or output variables then takes place. Measuring result 320 and predicted state 310 are able to be compared to one another in a step 325. A correction 330, which forms the basis of the further method of functioning of Kalman filter 300, results from the difference of the two. In particular, an adaptation 335 of the determined values of the model is undertaken in order to determine a new state 340, which is used for the following cycle of Kalman filter 300.

With a suitable coordination of Kalman filter 300, correction 330 becomes smaller after a few cycles so that the prediction of states of the system to be monitored becomes for reliable. The magnitude of correction 330 may be used as a measure of the reliability of a prediction of a system state.

What is claimed is:

1. A method for controlling a directed light source whose supplied light cone is guided across a predefined area, the method comprising:
   determining a movement of the light source;
   estimating an impending change in a section of the predefined area illuminated by the light cone as a result of the determined movement;
   determining that the impending change in the light cone into a modified light cone is to illuminate the section for longer than a predefined period of time; and
   providing a dimming signal for the light source;
   wherein if an estimated impending change causes a predefined overillumination of the section, then the dimming signal is provided prior to the overillumination, and
   wherein it is checked whether the estimated impending change results in an impending light emission of the light source that is safe for eyes,
   wherein the impending change is predicted with a Kalman filter, which operates recursively, and wherein input variables include yaw rate or acceleration values, and output values include a horizontal direction and/or a vertical direction, and/or an opening angle of the light cone, and
   wherein a plurality of sections are illuminated in sequence by the light cone, and wherein an alignment and/or activation of the light source occurs in a discontinuous manner to illuminate individual predefined sections one after the other.

2. The method of claim 1, wherein a plurality of non-overlapping sections in the predefined area and the sections are illuminated by the light cone one after the other for the predefined period of time in each case.

3. The method of claim 1, wherein the impending change includes the alignment of the light source, and wherein an inaccuracy of available information relating to the light cone is taken into account.

4. The method of claim 1, wherein the impending change includes the opening angle of the light source, and wherein an inaccuracy of available information relating to the light cone is taken into account.

5. The method of claim 1, wherein an inaccuracy of available information relating to the light cone is taken into account.

6. A control unit for a directed light source having a light cone, which is guided across a predefined area, comprising:
   a scanning device for determining a movement of the directed light source;
   a processing device to estimate an impending change in a section of the predefined area illuminated by the light cone as a result of the determined movement, and for determining that the impending change in the light cone into a modified light cone is to illuminate the section for longer than a predefined period of time; and
   an interface for supplying a dimming signal for the light source if the section is to be exposed to the changed light cone for longer than the predefined period of time;
   wherein if an estimated impending change causes a predefined overillumination of the section, then the dimming signal is provided prior to the overillumination,
   wherein it is checked whether the estimated impending change results in an impending light emission of the light source that is safe for eyes,
   wherein the impending change is predicted with a Kalman filter, which operates recursively, and wherein input variables include yaw rate or acceleration values, and output values include a horizontal direction and/or a vertical direction, and/or an opening angle of the light cone, and
   wherein a plurality of sections are illuminated in sequence by the light cone, and wherein an alignment and/or activation of the light source occurs in a discontinuous manner to illuminate individual predefined sections one after the other.

7. An optical sensor device, comprising:
   a directed light source, and a receiving device to receive light that was reflected by an object in a light cone;
   a control unit for the directed light source, the light cone of which is guided across a predefined area, including:
      a scanning device for determining a movement of the directed light source;
      a processing device to estimate an impending change in a section of the predefined area illuminated by the light cone as a result of the determined movement, and for determining that the impending change in the light cone into a modified light cone is to illuminate the section for longer than a predefined period of time; and
      an interface for supplying a dimming signal for the light source if the section is to be exposed to the changed light cone for longer than the predefined period of time;
   wherein if an estimated impending change causes a predefined overillumination of the section, then the dimming signal is provided prior to the overillumination,
   wherein it is checked whether the estimated impending change results in an impending light emission of the light source that is safe for eyes,
   wherein the impending change is predicted with a Kalman filter, which operates recursively, and wherein input variables include yaw rate or acceleration values, and output values include a horizontal direction and/or a vertical direction, and/or an opening angle of the light cone, and
   wherein a plurality of sections are illuminated in sequence by the light cone, and wherein an alignment and/or activation of the light source occurs in a discontinuous manner to illuminate individual predefined sections one after the other.

8. The optical sensor device of claim 7, wherein the optical sensor device is configured to be fixed in place on a motor vehicle, and wherein the scanning device is configured to determine a movement of the motor vehicle.

9. The optical sensor device of claim 7, wherein a plurality of non-overlapping sections in the predefined area and the sections are illuminated by the light cone one after the other for the predefined period of time in each case.

10. The optical sensor device of claim 7, wherein the impending change includes the alignment of the light source, and wherein an inaccuracy of available information relating to the light cone is taken into account.

11. The optical sensor device of claim 7, wherein the impending change includes the opening angle of the light source, and wherein an inaccuracy of available information relating to the light cone is taken into account.

12. The optical sensor device of claim 7, wherein an inaccuracy of available information relating to the light cone is taken into account.

* * * * *